(12) United States Patent
James et al.

(10) Patent No.: US 6,898,201 B1
(45) Date of Patent: May 24, 2005

(54) APPARATUS AND METHOD FOR INTER-NODE COMMUNICATION

(75) Inventors: David V. James, Palo Alto, CA (US); William Rivard, San Jose, CA (US)

(73) Assignee: Apple Computer, Inc., Cupertino, CA (US)

(*) Notice: Subject to any disclaimer, the term of this patent is extended or adjusted under 35 U.S.C. 154(b) by 210 days.

(21) Appl. No.: 10/040,166

(22) Filed: Dec. 31, 2001

Related U.S. Application Data

(62) Division of application No. 09/040,149, filed on Mar. 17, 1998, now abandoned.

(51) Int. Cl.[7] ............................................. H04L 12/28
(52) U.S. Cl. ....................... 370/400; 375/244; 375/286; 341/58
(58) Field of Search ................................ 370/282, 283, 370/284, 400, 401, 402, 465, 466, 467, 545; 375/286, 288; 341/56; 327/50

(56) References Cited

U.S. PATENT DOCUMENTS

| | | | | |
|---|---|---|---|---|
| 4,486,739 A | * | 12/1984 | Franaszek et al. | ............ 341/59 |
| 4,631,428 A | * | 12/1986 | Grimes | ........................ 326/59 |
| 5,740,201 A | * | 4/1998 | Hui | ............................. 375/286 |
| 5,859,669 A | * | 1/1999 | Prentice | ...................... 348/469 |
| 6,005,895 A | * | 12/1999 | Perino et al. | ............... 375/288 |

OTHER PUBLICATIONS

IEEE Std 1596.3, IEEE Standard for Low–Voltage Differential Signals (LVDS) for Scalable Coherent Interface (SCI), pp. 1–29, 1996.*

* cited by examiner

*Primary Examiner*—Frank Duong
(74) *Attorney, Agent, or Firm*—Nancy R. Simon

(57) ABSTRACT

A first set of signals is transformed into a second set of signals having a more stable set of current requirements. The more stable current requirements of the second set of signals are achieved by encoding the second set of signals with either an equal number, nearly an equal number, a constant number, or nearly a constant number of logic ones and logic zeros. A communication channel is provided for carrying the second set of signals from the first node to a second node.

34 Claims, 6 Drawing Sheets

| pin count | Signal Name | Description |
|---|---|---|
| 1 | scrubId (hardwired) | scrubber identifier (if not otherwise indicated) |
| 1 | clock (radial) | central clock/2 source |
| 1 | strobe | source-driven clock/2 indication |
| 4 | flags{0:3} | control indications |
| 32 | data{0:31} | multiplexed command&address/data |

FIG. 2

APPARATUS AND METHOD FOR INTER-NODE COMMUNICATION

CROSS REFERENCE TO RELATED APPLICATION

This is a division of U.S. patent application Ser. No. 09/040,149, filed on Mar. 17, 1998 abandoned.

BACKGROUND

1. Technical Field

The present invention relates generally to apparatus and methods for transmitting signals between nodes, and more particularly for transmitting signals at high bit-rates between nodes.

2. Background

A typical computer or inter-linked set of computers can be modeled as a series of nodes which communicate with one another point-to-point. Although nodes have in the past been attached to a bus, modern communications standards more commonly employ point-to-point interconnections. In the past, the communication data rate between such nodes was limited more by the performance of the computer or its various internal chips than by the speed of the traces or transmission lines by which the nodes were connected. Now as chip and computer speeds have substantially increased, these interconnects are hindering further performance improvements.

More specifically, current signaling architectures as well as the physical limitations of the traces and transmission lines themselves limit the maximum inter-node communications rate. Synchronized buses and point-to-point links are two of interconnect architectures commonly used. Synchronous bus architectures typically broadcast an address block to all nodes on a multiplexed bus. The node corresponding to the address then generates an acknowledgement block, which is also broadcast to all of the nodes. This architecture results in relatively low communications throughput. This is because each node must be synchronized to the same common reference clock so that address and acknowledgment blocks can be transmitted and received. Nodes employing the synchronous bus architecture must also take turns communicating, further limiting the maximum possible inter-node data rate, especially when a large number of nodes are connected to the same bus. The multiplexed buses used with synchronous bus architectures also typically contain intermediate stubs and additional signal paths that limit the effective speed of data transfer between nodes.

Point-to-point link architectures are comparatively more time efficient since their signals have an affiliated reference clock signal. Using a point-to-point link architecture, two nodes can transfer data at a rate independent of other nodes and of any common reference clock. However, point-to-point link inter-node data rates still tend to be limited by the physical limitations in the traces and transmission lines.

For instance, modern computers typically communicate by either single-ended or differential signaling. Both of these forms of signaling are well known in the art. Ideally, single-ended connections require only one physical line per logic signal. However, as communication rates have increased so has ground-bounce, which is inherent in single-ended systems. Attempts to solve the ground-bounce problem include adding power supply and ground pins for each single-ended logic line on a chip, effectively tripling the number of physical traces required. Thus, six single-ended logic signals can require up to eighteen physical traces. Differential signaling systems require two physical traces for each logic signal. Thus, six differential logic signals require at least twelve physical traces. Since silicon and computer resources are finite, a large number of traces or transmission lines can significantly increase the cost of manufacturing the chip or the computer.

Regardless of whether single-ended or differential signaling is used, the physical traces and transmission lines all have an inherent parasitic inductance. As the data rate over these pathways increases, the parasitic inductance combined with the quickly varying signal currents generate parasitic voltages that interfere with and corrupt the signals traveling over these pathways.

Additionally, large signal currents that pass through the traces and transmission lines can generate Electro-Magnetic Interference (EMI) noise which further corrupts signals traveling between the nodes. Such EMI noise may also, from time to time, exceed the limits of various well known regulatory standards for permissible EMI radiation levels.

Other prior art approaches have employed RAMBUS technology (manufactured by RAMBUS, Inc. of Mountain View, Calif.) to reduce the parasitic and EMI noise voltages present on some signal lines. The RAMBUS approach consists of a number of traces or transmission lines, each of which transmits a different signal. Ideally, these signal lines are kept in close proximity to one another. One of the signal lines is designated as a reference and used to cancel out some of the noise effects present on the signal lines. A shortcoming of this approach is a noticeable current surge when all of the signal lines are either logic 1's or logic 0's.

SUMMARY

The present invention delineates an inter-node communications paradigm for enabling signals to be transmitted between nodes at a higher rate. The higher rate is possible due to an encoding schema that reduces current demands and fluctuations between multiple nodes. The encoding schema also requires fewer physical traces and/or transmission lines than high speed single-ended and differential signaling circuits.

Within the apparatus of the present invention, a first node is connected to a communication channel. Operations on the first node result in a first set of signals that are to be transmitted over the communication channel. The logic states which comprise the first set of signals may range from all logic zeros to all logic ones. This large number of potential logic transitions results in large current fluctuations over the communication channel. To reduce and/or eliminate these current fluctuations, the present invention also includes an encoder or lookup table for transforming the first set of signals into a second set of signals having either an equal number, nearly an equal number, a constant number, or nearly a constant number of logic ones and logic zeros. In one embodiment, groups of six signals from the first set of signals are encoded into eight signals in the second set of signals.

Within the method of the present invention, a first set of signals from a first node are encoded into a second set of signals having either an equal number, nearly an equal number, a constant number, or nearly a constant number of logic ones and logic zeros. This second set of signals is then transmitted over a communication channel.

Thus, the present invention presents a communications technique which has quieter switching currents than single-ended circuits and requires fewer physical traces and transmission lines than differential circuits. The present invention can be applied to communications between computer chips on a circuit board as well as between nearby computers linked together. These and other aspects of the invention will be recognized by those skilled in the art upon review of the detailed description, drawings, and claims set forth below.

BRIEF DESCRIPTION OF THE DRAWINGS

FIG. 2 is a table of unencoded signals utilized by each node within the apparatus of FIG. 1;

DETAILED DESCRIPTION

Figure 1:
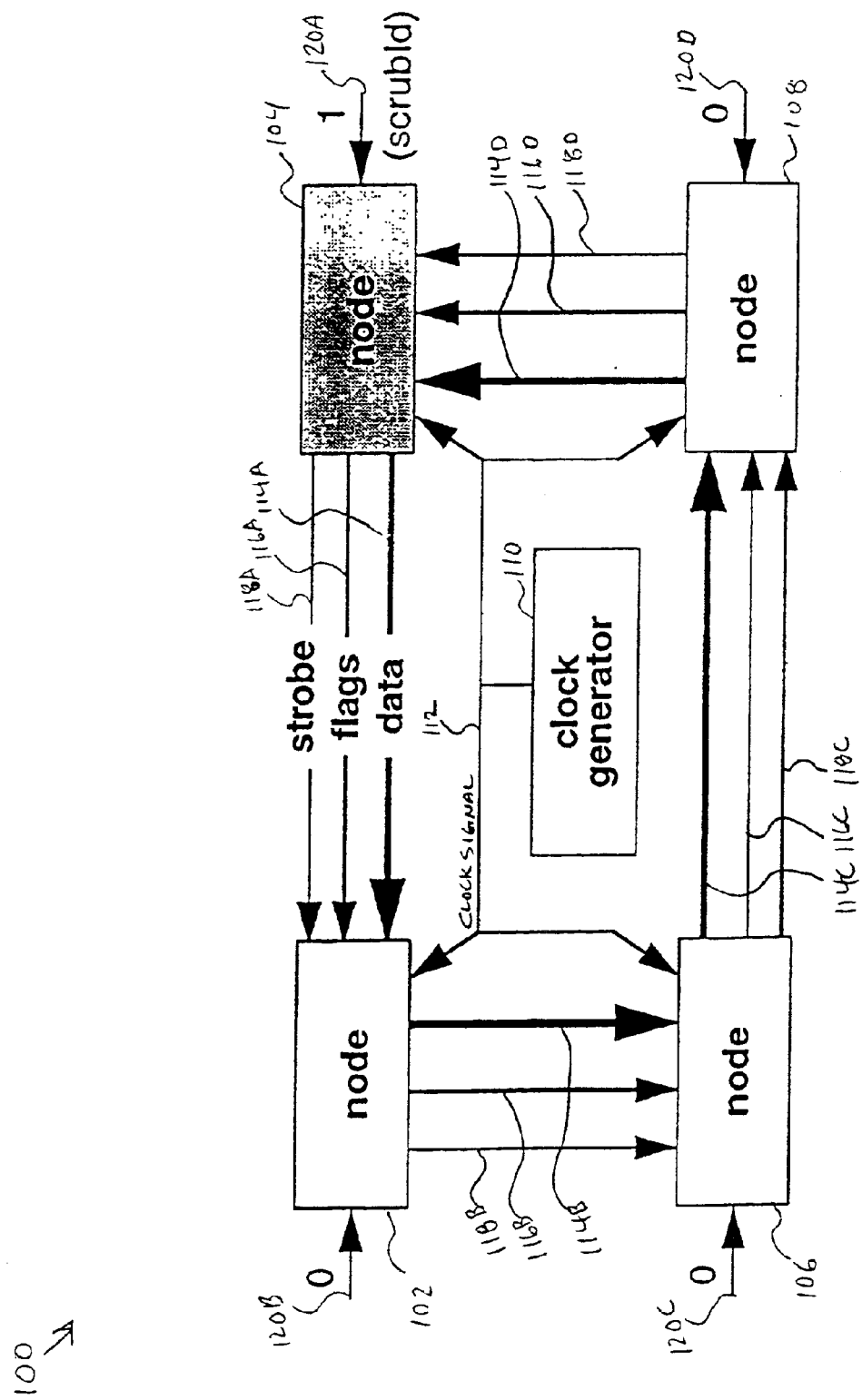
FIG. 1 is a block diagram of an apparatus for inter-node communication.

FIG. 1 is a block diagram of an apparatus 100 for transmitting high bit-rate signals between a set of nodes. The apparatus 100 includes a first node 102, a second node 104, a third node 106, a fourth node 108 and a clock generator 110. The apparatus is designed to provide the functionality of a synchronous bus, with the performance advantages of point-to-point signaling. Each node 102, 104, 106 and 108 receives a clock signal on line 112 from the clock generator 110, data signals on lines 114A, B, C and D, flag signals on lines 116A, B, C and D, and strobe signals on lines 118A, B, C and D. Collectively, the signals on lines 114, 116, and 118 make up a shared communications channel/link between the nodes 102, 104, 106 and 108. Those skilled in the art will be aware of various other receive and transmit signals which can also be passed between the nodes 102, 104, 106 and 108, depending upon the application or transmission protocol.

Data transmissions between nodes 102, 104, 106 and 108 are source synchronous. Even though all of the nodes also receive the clock signal on line 112, the strobe signals on lines 118A, B, C and D act as a reference clock for these data transmissions. The strobe signal resolves any frequency differences in timing between the transmitting and receiving node. Although each node has to compensate for arbitrary frequency differences between its incoming data and the clock signal on line 112, this arrangement eliminates the need to insert or delete symbols to adjust for inter-node timing differences. Strobe signals also enable higher transmission bandwidths between the nodes because there is no longer a need to accurately synchronize all of the nodes within the apparatus 100. The inter-node transmission rates are not affected by inter-node transmission delays, thus arbitrary delays between each of the nodes are acceptable.

Using the point-to-point link data communication architecture, the nodes transmit requests and responses as send packets. The receiving node strips the send packet of its data and then returns a small acknowledgment (i.e. "ack") packet. Routing architectures for the packets are preferably straightforward. In the preferred embodiment, the send packets addressed to a specific node are stripped from the inter-node data stream flowing on lines 114A, B, C, and D by that node and are replaced with ack packets. The send and ack packets addressed to other nodes are passed through any intermediate nodes. The ack packets are stripped from the inter-node data stream when they return to the original transmitting node.

For example, in order for node 102 to transmit data to node 108, node 102 must first generate a send packet addressed to node 108. Node 102 then transmits this send packet to node 106. Node 106 looks at the address of the send packet and since the send packet is not intended for node 106, passes the send packet along to node 108. Node 108 then looks at the address of the send packet and since the send packet is intended for node 108, strips the send packet from the inter-node data stream and generates an ack packet addressed to node 102. Node 108 then sends the ack packet to node 104. Node 104 looks at the address of the ack packet and since the ack packet is not intended for node 104, passes the ack packet along to node 102. Node 102 then looks at the address of the ack packet and since the ack packet is intended for node 102, strips the ack packet from the inter-node data stream. After this last step the data exchange between nodes 102 and 108 is complete.

The flags on lines 116A, B, C, and D are used for data stream packet-framing. Data stream packet-framing consists of labeling each packet with either a first-packet symbol, a between-packet-idle symbol, or a last-packet symbol. These flags are also used for arbitration purposes. Arbitration protocols place a limit on a number of consecutive packets that can be sent by any one node. This ensures that each node has an opportunity to send its packets over the shared link.

Preferably one, and only one, of the nodes 102, 104, 106, 108 functions as a "scrubber" within the apparatus 100. The scrubber performs such maintenance functions as, removing mis-addressed packets on their second pass around the shared link. The scrubber can be selected by setting a scrubId line 120A, B, C or D on the selected node to logic "1" (node 104 in FIG. 1) and setting the remaining scrubId lines 120A, B, C or D to logic "0" (nodes 102, 106 and 108 in FIG. 1). Those skilled in the art will know of other vendor-dependent scrubber-assignment techniques that can be used.

FIG. 2 is a table 200 of unencoded signals utilized by each node within the apparatus of FIG. 1. The signals include a 1-pin scrubber identifier (scrubId) 202, a 1-pin central clock (clock) 204, a 1-pin strobe 206, 4-pins of flags 208, and 32-pins of data.

The scrubId signal 202 is received by the nodes on lines 120A, B, C, and D, and uniquely identifies a particular node as the scrubber within the shared communications channel (also known by those skilled in the art as a ringlet). In an alternate embodiment, a vendor-dependent scrubber-identification technique can be provided.

The clock signal 204 is preferably an input-only signal received by the nodes on line 112, and provides the nodes with a reference for synchronizing their internal frequency-lock loops. The frequency-lock-loops within the nodes permit a lower clock generator 110 frequency, which in turn simplifies clock signal distribution. For example, a 50 MHz dock signal can be frequency-lock-looped up to 500 MHz. Also since the frequency-lock loops within the nodes are tracking the clock signal fairly closely, the cycles per second each node sees is about the same.

Frequency locking, rather than phase locking, is used because arbitrary, but fixed, phase differences can be tolerated and a small input-data FIFO can compensate for any incoming phase differences. The FIFO compensates for the fixed phase error between each node. The fixed phase error is random and cannot be controlled. The strobe signal 206, received by the nodes on lines 118A, B, C, and D, is preferably complemented on each cycle, so that a receiving node can accurately determine when incoming (source-synchronous) data should be latched.

The flag signals 208, received by the nodes on lines 116A, B, C, and D, transfer control and framing information between the nodes.

The data signals 210, received by the nodes on lines 114A, B, C, and D, transmit the contents of the send and ack packets. Preferably, most-significant bits are sent first when sending a packet header, and lower addresses are sent first when sending data. While the present inter-node data packets contain 32 data bits, other data packet capacities, such as 8, 16, 64, or 128 data bits, are also acceptable. Alternatively, large data-words may be broken up and sent over multiple clock cycles. For instance a large 64 bit data packet could be sent as two smaller 32 bit data packets. When deciding how many bits to include in a data packet, designers should consider that while 8-bit data packets may be more cost effective in terms of coding or hardware to implement, such small data packet designs have less bandwidth per pin due to the relatively-fixed overhead of the scrubId, clock, strobe, and flag pins. However, while 128-bit data packets may have more bandwidth per pin, such large data packets may be more expensive to implement in terms of coding, hardware, and/or skew-management circuits.

Figure 3:
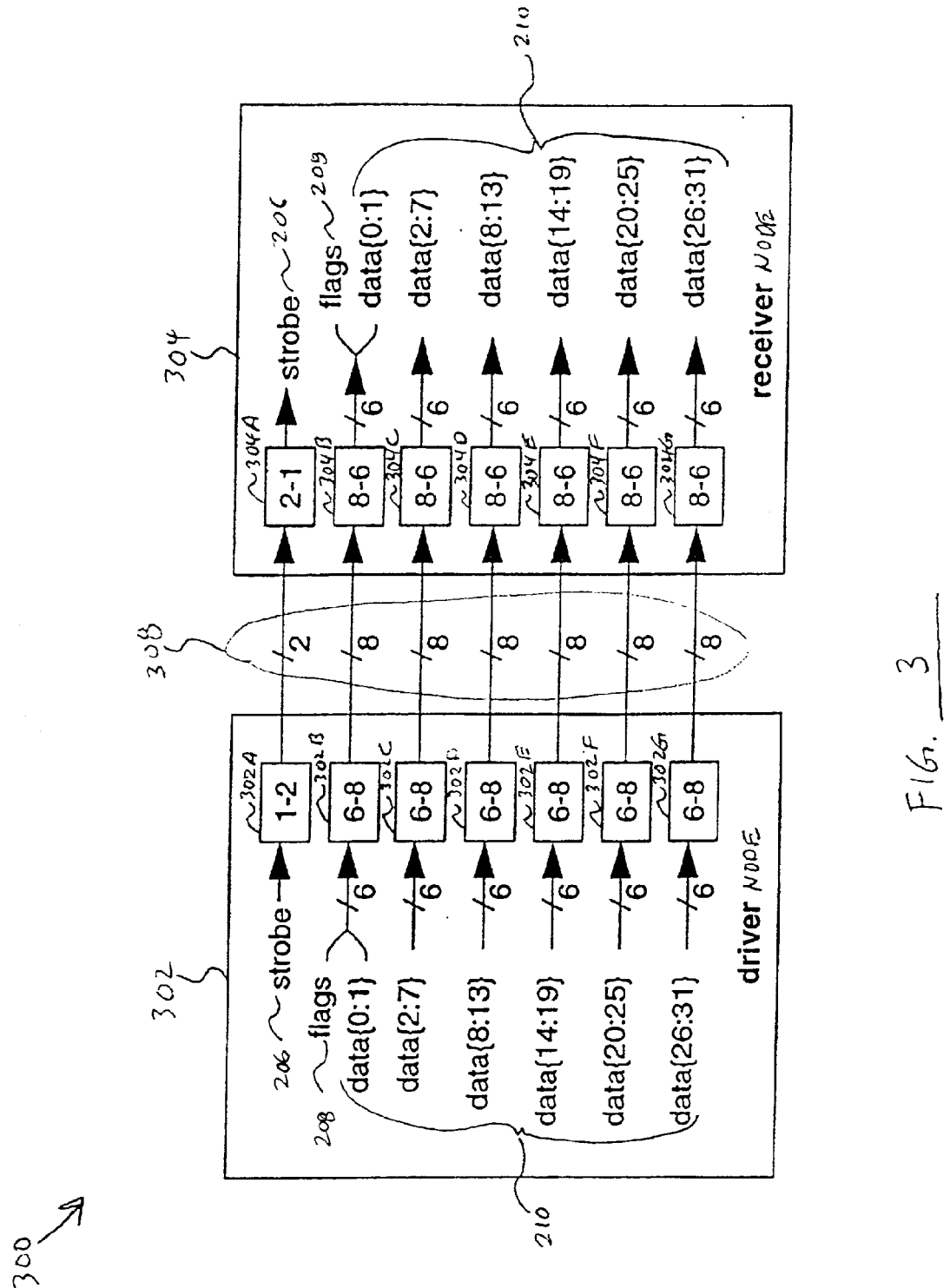
FIG. 3 is a block diagram of an apparatus for encoding and transmitting signals between a set of nodes.

FIG. 3 is a block diagram of an apparatus 300 for encoding and transmitting the signals 206, 208, and 210 between a set of nodes. The apparatus includes a driver node 302 and a receiver node 304 which can represent any pair of the FIG. 1 nodes 102, 104, 106, and 108. The driver node 302 includes a plurality of encoders 302A–G and the receiver node 304 includes a plurality of decoders 304A–G. The nodes 302 and 304 communicate via a set of traces, circuit paths, and/or transmission lines 308. These traces, circuit paths, and transmission lines 308 collectively make up part of the communications channel between the two nodes and perform the same roles as the data 114, flag 116, and strobe 118 lines of FIG. 1. The nodes themselves can include any number of inter-linked devices. These inter-linked devices can be computer chips, circuit boards, and/or stand alone computers.

The apparatus 300 transmits the signals between the nodes by either a dedicated line (such as for the scrubId signals on lines 120A–D and the clock signal on line 112) or after implementing an encoding schema (such as for the strobe, flags and data signals). By selectively encoding the strobe, flag and data signals transmitted between the nodes 302, 304, ground-bounce during high-speed signaling, can be reduced. Preferably the strobe, flag and data signals are grouped and encoded in such a way that nearly an equal (called DC-free encoding) and/or constant (called DC-balanced encoding) number of logic 0's and 1's are always transmitted between the driver node 302 and the receiver node 304. These encoding schemas are preferably implemented using an even number of data lines 308.

One way to implement a DC-balanced encoding schema is shown in FIG. 3. The strobe 206 signal is fed into a 1 to 2 encoder 302A which uses a complementary encoding schema before the signal is transmitted over the data lines 308. The flag 208 and data 210 signals, however, are divided into groups of six unencoded signals (i.e. 6-bits), which are then converted into groups of eight encoded signals (i.e. 8-bits). These eight encoded signals are then transmitted in parallel over the data lines 308. Other signal coding schemas, such as when groups of four unencoded signals (i.e. 4-bits) are converted into groups of six encoded signals (i.e. 6 bits), can also be used.

DC-free encoding schemas can be implemented by transmitting an even number of encoded signals with an equal number of logic 1's and 0's in parallel over the data lines 308. The DC-Balanced and DC-Free encoding schemas have the following characteristics: First, a constant number of 1's valued lines is always driven and thus the driver node 302 is balanced. A balanced driver node means that total current over the data lines 308 is fairly constant. Second, ground-bounce noise is reduced, since logic transitions from all zeros to all ones and from all ones to all zeros are eliminated. Third, an implied reference voltage can be obtained by averaging all of the data line 308 voltages. Fourth, parity protection is inherent, since all single-bit transmissions failures, and many double-bit errors, can be detected as an illegal (i.e. non-DC-balanced) input code value. Fifth, peak current demands are reduced, since for each of the unencoded signals, only half of the data lines are actively driven to a high current logic state (such as logic "1"). Sixth, the encoding schema allows extra control characters to be transmitted (for instance, in a 6-to-8 bit encoding schema there are 6 unmapped 8-bit encoded values for each set of 64 unencoded values).

A nearly DC-free/nearly DC-balanced encoding schema can be implemented by transmitting an odd number of bits, which contain no more than one extra logic 1 or logic 0, in parallel over the data lines 308. For instance, a 6/7 encoding schema (i.e. where 6-bits are encoded into 7-bits) may be used where a logic 1 to logic 0 ratio is either 3-to-4 or 4-to-3. Although more efficient, this nearly free/balanced encoding schema has no parity protection and may be subject to signal-integrity limitations. This encoding schema also results in a less accurate threshold reference voltage, once all of the received signal values are averaged by the decoders 304A–G.

The encoding schema herein taught requires extra-pinouts (for example, the 6-to-8 schema requires an additional 2-pins for every 6 signals). However, these additional demands upon limited silicon and PC-board resources are offset by a reduction in a number of required ground and/or power pins when compared with current unencoded full-swing signals transmitted over single-ended data lines. To localize any chip or PC-board ground-plane currents, each set of 8 signal traces is preferably routed as a group. While the 6-to-8 bit encoding schema is preferred, sometimes the number of unencoded signal lines are not always multiples of 6. In those cases other encoding options are possible, such as 1-to-2 (differential), 2-to-4 (also differential), and 4-to-6 encoding schemas.

Figure 4:
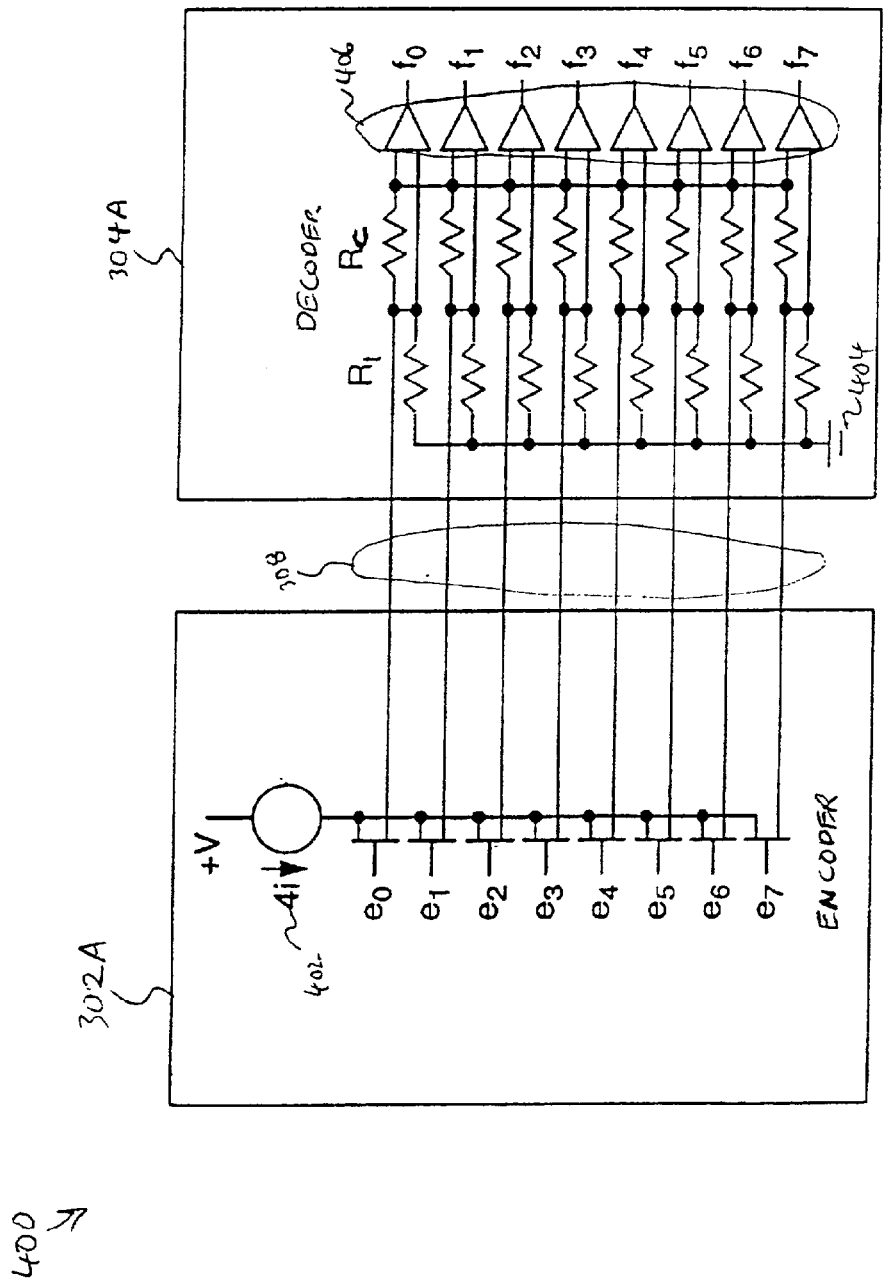
FIG. 4 is a partial electrical circuit of an encoder and decoder pair within the apparatus for encoding and transmitting the signals between the set of nodes.

FIG. 4 is a partial electrical circuit 400 of the encoder 302A and the decoder 304A pair within the apparatus 300 for encoding and transmitting the signals between the set of nodes. The circuit 400, shown in FIG. 4, effects a 6-to-8 bit encoding schema which employs a simple technology-independent technique for driving the data lines 308 by switching a constant current 402 (i.e. "4i") to half (i.e. 4) of the total number (i.e. 8) of data lines 308 which are driven to a high current logic state lines. Only half of the data lines are driven since a DC-free encoding schema is effected. A zero volt termination voltage 404, rather than a fixed positive voltage, enables the circuit to be supply-voltage independent. In the circuit 400, termination resistors, $R_t$, are effected using on chip FETs. The value of $R_t$ is matched to the impedance of each data-line 308. A typical termination resistance is 75 Ω. Averaging resistors, RC, are chosen so that the threshold reference voltage of the decoder 304A is one half of the driven signal levels on the data lines 308. The decoder 304A then uses differential amplifiers 406 to compare the signals on the data-lines 308 with the threshold reference voltage to determine whether, for example, a logic "1" or a logic "0" has been transmitted.

Portions of the encoding and decoding hardware described in FIG. 3 may also be implemented in software. In so doing, additional configurable elements, such as a processing unit, a memory, and a storage device (not shown) need to be added to FIGS. 1, 3, and 4. The memory would store computer program instructions for controlling how the processing unit accesses, transforms and outputs data. Those skilled in the art will recognize that in alternate embodiments the memory could be replaced with a functionally equivalent computer-useable medium such as a compact disk, a hard drive or a memory card.

Figure 5:
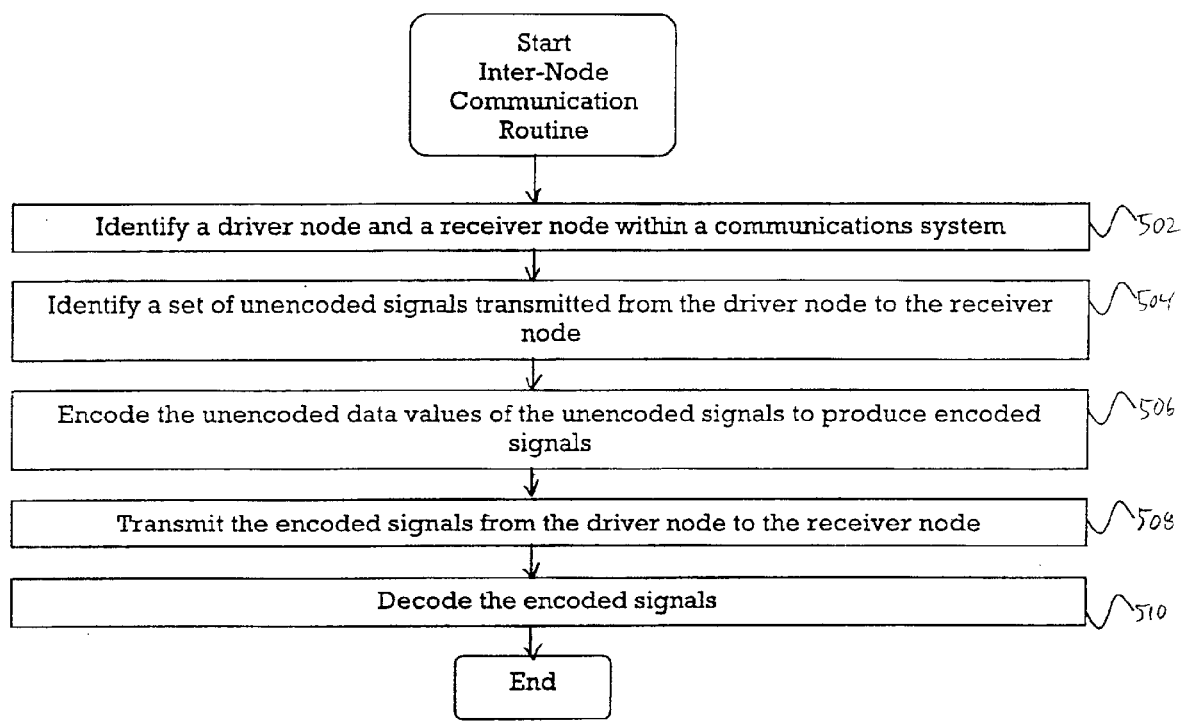
FIG. 5 is a flowchart of a method for inter-node communication.

FIG. 5 is a flowchart of a method for inter-node communication. The method begins in step 502 where a driver node and a receiver node are identified within a communications system. Next, in step 504, a set of unencoded signals transmitted from the driver node to the receiver node are identified. The signals include a set of data values (i.e. logic "1's" and logic "0s"). In step 506, the unencoded data values of the unencoded signals are encoded to produce encoded signals. Next, in step 508, the encoded signals are transmitted from the driver node to the receiver node. In step 510, the encoded signals are decoded. After step 510, the method for inter-node communication is complete.

Figure 6:
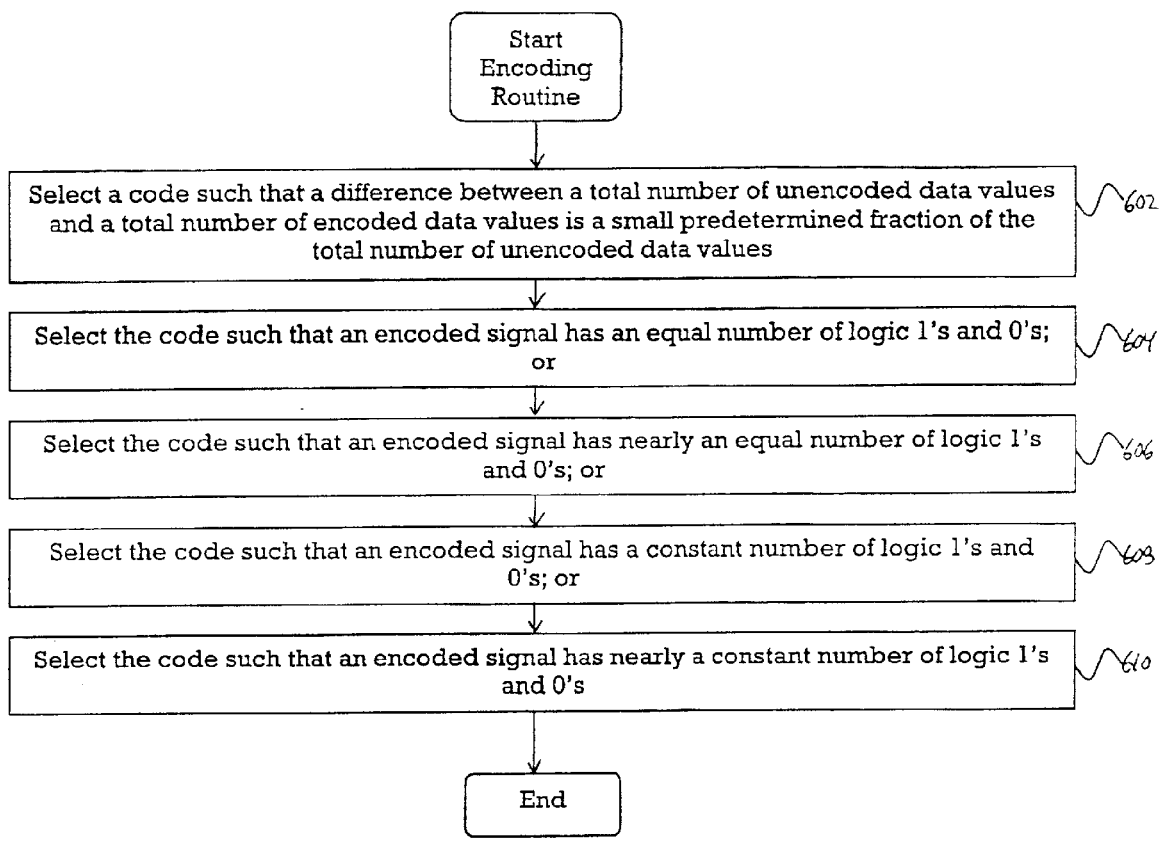
FIG. 6 is a flowchart of a method for encoding inter-node communication signals.

FIG. 6 is a flowchart of a method for encoding the data values of the inter-node communication signals (step 506 of FIG. 5). The method begins in step 602 by selecting a code such that a difference between a total number of unencoded data values and a total number of encoded data values is a small predetermined fraction of the total number of unencoded data values. A 6-bit unencoded signal to 8-bit encoded signal coding schema is preferred, however a 4-bit unencoded signal to 6-bit encoded signal coding schema may be more appropriate in some applications. Codes may be stored in a set of lookup tables or generated using algorithmic methods. Codes may also be switched at any point during signal transmission provided that the switch is communicated to the receiver node. In step 604, the code is selected such that an encoded signal has an equal number of logic 1's and 0's. Alternatively, in step 606 the code is selected such that an encoded signal has nearly an equal number of logic 1's and 0's. Alternatively, in step 608 the code is selected such that an encoded signal has a constant number of logic 1's and 0's. Alternatively, in step 610 the code is selected such that an encoded signal has nearly a constant number of logic 1's and 0's. After step 610, the method for encoding the inter-node communication signals is complete.

While the present invention has been described with reference to a preferred embodiment, those skilled in the art will recognize that various modifications may be made. Variations upon and modifications to the preferred embodiment are provided by the present invention, which is limited only by the following claims.

What is claimed is:

1. A method for inter-node communication, comprising the steps of:
    dividing a plurality of unencoded signals into groups at a first node, wherein each group includes a portion of the unencoded signals;
    transforming each group of unencoded signals into a group of encoded signals, wherein each group of encoded signals has nearly an equal number of logic 1's and logic 0's; and
    transmitting the groups of encoded signals to a second node, whereby the groups of encoded signals are transmitted with minimal current fluctuations.

2. The method of claim 1 wherein each group of unencoded signals includes an equal number of signals.

3. The method of claim 1 wherein the step of transforming each group of unencoded signals into a group of encoded signals comprises the step of transforming a group of unencoded signals into a group of encoded signals having an equal number of logic 1's and logic 0's using one of the selected at least one encoding scheme.

4. The method of claim 1 wherein the step of transforming each group of unencoded signals into a group of encoded signals comprises the step of transforming a group of six unencoded signals into a group of eight encoded signals.

5. The method of claim 1 wherein the step of transforming each group of unencoded signals into a group of encoded signals comprises the step of transforming a group of four unencoded signals into a group of six encoded signals.

6. The method of claim 1 further comprising the step of selecting at least one encoding scheme prior to performing the step of transforming each group of unencoded signals into a group encoded signals.

7. The method of claim 6 wherein the at least one encoding scheme transforms a group of unencoded signals to encoded signals such that a difference between a total number of unencoded data values and a total number of encoded data values is a fraction of the total number of unencoded data values.

8. The method of claim 1 further comprising the step of transforming the groups of encoded signals received by the second node back into the plurality of unencoded signals.

9. A method for inter-node communication, comprising the steps of:
    dividing a plurality of unencoded signals into groups at a first node, wherein each group includes a portion of the unencoded signals;
    transforming each group of unencoded signals into a group of encoded signals, wherein each group of encoded signals has nearly a constant number of logic 1's and logic 0's; and
    transmitting the groups of encoded signals to a second node, whereby the groups of encoded signals are transmitted with minimal current fluctuations.

10. The method of claim 9 wherein each group of unencoded signals includes an equal number of signals.

11. The method of claim 9 wherein the step of transforming each group of unencoded signals into a group of encoded signals comprises the step of transforming a group of unencoded signals into a group of encoded signals having a constant number of logic 1's and logic 0's using one of the selected at least one encoding scheme.

12. The method of claim 9 further comprising the step of selecting at least one encoding scheme prior to performing the step of transforming each group of unencoded signals into a group of encoded signals.

13. The method of claim 12 wherein the at least one encoding scheme transforms a group of unencoded signals to encoded signals such that a difference between a total number of unencoded data values and a total number of encoded data values is a fraction of the total number of unencoded data values.

14. The method of claim 9 further comprising the step of transforming the groups of encoded signals received by the second node back into the plurality of unencoded signals.

15. An apparatus for inter-node communication, comprising:
    means for dividing a plurality of unencoded signals into groups at a first node, wherein each group includes a portion of the unencoded signals;

means for transforming each group of unencoded signals into a group of encoded signals, wherein each group of encoded signals has nearly an equal number of logic 1's and logic 0's; and means for transmitting the groups of encoded signals to a second node, whereby the groups of encoded signals are transmitted with minimal current fluctuations.

16. The apparatus of claim 15 further comprising means for selecting at least one encoding scheme prior to transforming each group of unencoded signals into a group of encoded signals.

17. The apparatus of claim 16 wherein the at least one encoding scheme transforms a group of unencoded signals to encoded signals such that a difference between a total number of unencoded data values and a total number of encoded data values is a fraction of the total number of unencoded data values.

18. The apparatus of claim 16 wherein the means for transforming each group of unencoded signals into a group of encoded signals comprises means for transforming a group of unencoded signals into a group of encoded signals having an equal number of logic 1's and logic 0's using one of the selected at least one encoding scheme.

19. The apparatus of claim 17 wherein the means for transforming each group of unencoded signals into a group of encoded signals comprises means for transforming a group of six unencoded signals into a group of eight encoded signals.

20. The apparatus of claim 17 wherein the means for transforming each group of unencoded signals into a group of encoded signals comprises means for transforming a group of four unencoded signals into a group of six encoded signals.

21. The apparatus of claim 15 further comprising means for transforming the groups of encoded signals received by the second node back into the plurality of unencoded signals.

22. An apparatus for inter-node communication, comprising:

means for dividing a plurality of unencoded signals into groups at a first node, wherein each group includes a portion of the unencoded signals;

means for transforming each group of unencoded signals into a group of encoded signals, wherein each group of encoded signals has nearly a constant number of logic 1's and logic 0's; and means for transmitting the groups of encoded signals to a second node, whereby the groups of encoded signals are transmitted with minimal current fluctuations.

23. The apparatus of claim 22 further comprising means for selecting at least one encoding scheme prior to transforming each group of unencoded signals into a group of encoded signals.

24. The apparatus of claim 23 wherein the at least one encoding scheme transforms a group of unencoded signals to encoded signals such that a difference between a total number of unencoded data values and a total number of encoded data values is a fraction of the total number of unencoded data values.

25. The apparatus of claim 23 wherein the means for transforming each group of unencoded signals into a group of encoded signals comprises means for transforming a group of unencoded signals into a group of encoded signals having a constant number of logic 1's and logic 0's using one of the selected at least one encoding scheme.

26. The apparatus of claim 22 further comprising means for transforming the groups of encoded signals received by the second node back into the plurality of unencoded signals.

27. A computer-useable medium including computer program code for causing a computer to effect inter-node communication by performing the steps of:

dividing a plurality of unencoded signals into groups at a first node, wherein each group includes a portion of the unencoded signals;

transforming each group of unencoded signals into a group of encoded signals, wherein each group of encoded signals has nearly an equal number of logic 1's and logic 0's; and transmitting the groups of encoded signals to a second node; whereby the groups of encoded signals are transmitted with minimal current fluctuations.

28. The computer-useable medium of claim 27 further comprising computer program code for causing a computer to effect inter-node communication by performing the step of selecting at least one encoding scheme prior to transforming each group of unencoded signals into a group of encoded signals.

29. The computer-useable medium of claim 28 wherein the step of transforming each group of unencoded signals into a group of encoded signals comprises the step of transforming a group of unencoded signals into a group of encoded signals having an equal number of logic 1's and logic 0's using one of the selected at least one encoding scheme.

30. The computer-useable medium of claim 27 further comprising computer program code for causing a computer to effect inter-node communication by performing the step of transforming the groups of encoded signals received by the second node back into the plurality of unencoded signals.

31. A computer-useable medium including computer program code for causing a computer to effect inter-node communication by performing the steps of:

dividing a plurality of unencoded signals into groups at a first node, wherein each group includes a portion of the unencoded signals;

transforming each group of unencoded signals into a group of encoded signals, wherein each group of encoded signals has nearly a constant number of logic 1's and logic 0's; and transmitting the groups of encoded signals to a second node, whereby the groups of encoded signals are transmitted with minimal current fluctuations.

32. The computer-useable medium of claim 31 further comprising computer program code for causing a computer to effect inter-node communication by performing the step of selecting at least one encoding scheme prior to transforming each group of unencoded signals into a group of encoded signals.

33. The computer-usable medium of claim 32 wherein the step of transforming each group of unencoded signals into a group of encoded signals comprises the step of transforming a group of encoded signals into a group of encoded signals having a constant number of logic 1's and logic 0's using one of the selected at least one encoding scheme.

34. The computer-usable medium of claim 31 further comprising computer program code for causing a computer to effect inter-node communication by performing the step of transforming the groups of encoded signals received by the second node back into the plurality of unencoded signals.

* * * * *